J. A. MacLEAN.
NUT LOCK.
APPLICATION FILED DEC. 11, 1916.

1,247,854.

Patented Nov. 27, 1917.

Inventor
J. A. MacLean
By
Fetherstonhaugh & Co
Attys.

UNITED STATES PATENT OFFICE.

JOHN A. MacLEAN, OF WILMETTE, ILLINOIS.

NUT-LOCK.

1,247,854.  Specification of Letters Patent.  Patented Nov. 27, 1917.

Application filed December 11, 1916. Serial No. 136,350.

*To all whom it may concern:*

Be it known that I, JOHN A. MACLEAN, a citizen of the United States, and resident of Wilmette, in the State of Illinois and United States of America, have invented certain new and useful Improvements in Nut-Locks, of which the following is a full, clear, and exact description.

This invention relates to improvements in nut locks, and the object of the invention is to provide a simple, inexpensive and efficient nut lock, which may be applied with an ordinary wrench in a minimum of time by unskilled labor, and which may be used repeatedly.

The device consists of a washer of a shape and size corresponding to the nut with which it is to be used. The top and bottom faces of the washer are each provided with an annular portion surrounding the bore, and arranged in the form of a helix having approximately the same pitch as the thread which is formed in the bore. Owing to the helical formation of these annular portions, it follows that approximately one-half of each annulus projects beyond the surface of the washer, while approximately the other half is sunk below the surface. It also results that an abrupt step is formed where the ends of each helix meet. In manufacture, the washer is blanked out in a suitable press, the helical annuli being formed at the same time and with their ends in line with one another in the axial direction of the washer. The washer is then threaded in the usual manner, and the result produced is that each end of a thread projects beyond the surface of the nut.

In the drawings which illustrate the invention:—

Figure 1:
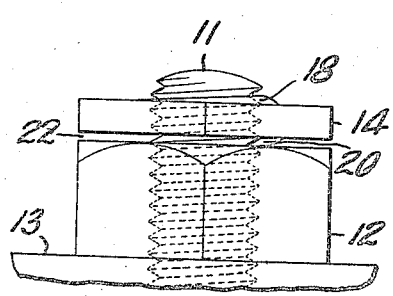
Figure 1 is a side elevation of a nut and bolt with the locking washer.
Figure 2:
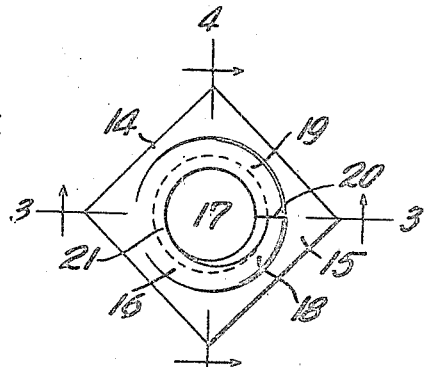
Fig. 2 is a plan view of the washer.
Figure 3:
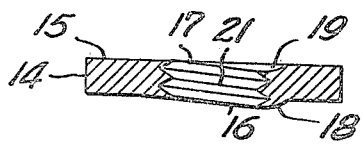
Figure 4:
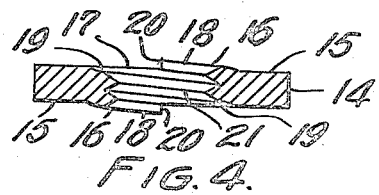

Figs. 3 and 4 are sectional views of the washer on the line 3—3 and 4—4 respectively of Fig. 2.

Figure 5:
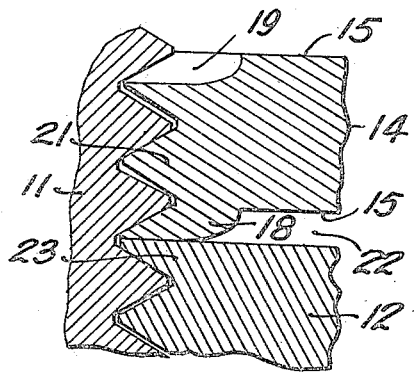

Fig. 5 is an enlarged vertical section illustrating the operation of the washer.

Figure 6:
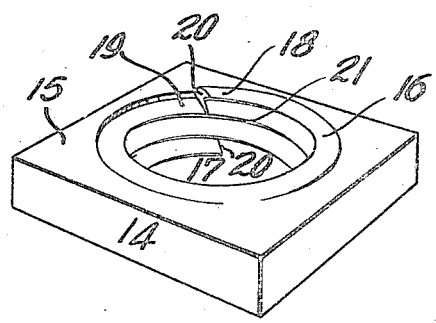

Fig. 6 is a perspective view of the washer.

Referring more particularly to the drawings, 11 designates a bolt and 12 a nut screwed thereon against a surface 13. The locking washer or nut lock 14, consists of a comparatively thin body of a shape and size corresponding to the nut, in order that if desired the washer and nut may be screwed down simultaneously.

Each face 15 of the washer is provided with an annular portion 16 of helical formation adjacent the bore 17. Approximately one half of each annulus, designated 18, projects beyond the surface of the nut, while approximately the remaining half 19 is sunk below the surface, as will be clearly seen in Fig. 6. When one complete helix has been formed, the lower end thereof is naturally in line with the upper end in the axial direction of the washer, and an abrupt shoulder 20 occurs at this point, which is the end of the projecting portion 18 of the annulus. In the formation of the washer, the abrupt ends of these annuli are arranged in line with one another in the axial direction of the nut, as clearly shown in Figs. 4 and 6. It might be stated that in effect the entire metal surrounding the bore is upset to the helical form, the metal under the depressed portions of the annulus on one side being displaced to form the projecting portion of the annulus on the other side of the washer. The pitch of the helix thus formed is substantially the same as the pitch of the thread 21, with which the bore is provided. The result produced is in effect that each end of the thread is carried beyond the surface of the nut for approximately one half the circumference.

The operation of the device is extremely simple. The nut 12 is screwed down on the bolt as tightly against the surface 13 as desired. The washer 14 being of the same shape and size as the nut, may be screwed down simultaneously therewith, or may be applied as a separate operation. The lower surface of the washer remains substantially parallel with the upper surface of the nut, so that when the projecting portion 18 of the annulus is in engagement with the nut, the surface of the washer is slightly spaced away from the surface of the nut, as at 22, so that the nut offers no resistance to further downward movement of the washer, except at the comparatively small contacting portion 18. The washer is now given a slight additional turn, so that the portion 18 or thread which projects beyond the surface of the washer continues to move downwardly following the pitch of the bolt thread, and the abrupt end 20 wedges very tightly in between the first exposed thread of the bolt and the upper surface of the nut. If sufficient force is applied, this wedging slightly distorts the threads of the bolt, nut or washer, or possibly all three. The upper surface of the washer thread 21 binds very tightly against the lower surface of the bolt thread, and at the same time, the projecting portion 18 forces the end of the nut thread 23 down very tightly on the upper surface of the bolt thread which it engages. This distortion occurs only through a comparatively small part of the circumference, and is in reality very slight, but amply sufficient to hold both the nut and washer against any return movement. The fact that distortion does occur and is sufficient to hold both nut and washer against movement has been demonstrated by experiments, in which a washer was tightened down on a nut, as previously described. The surface 13 was then removed, and the nut screwed farther down the thread out of engagement with the washer. The washer was found to be for all practical purposes as firmly locked to the bolt against revolution in either direction as when the nut was in contact therewith.

By the application of sufficient force to remove the washer, the distortions of the bolt and washer threads are corrected, at least to a sufficient extent to enable both the washer and bolt to be used again. It is obvious that as the washer is exactly similar on each face, it may be applied either side up, so that there is no possibility of improper application from such a cause. It is also obvious that the washer may be applied under the nut as well as over the same. In such a case, the washer is treated as if it were a nut, and is tightened down on the surface 13. The nut is then given a slight further tightening and the projecting portion 18 on the upper surface of the washer wedges between the lower surface of the nut to the first exposed thread of the bolt in exactly the same manner as previously described.

The washers may obviously be manufactured very cheaply, as the forming and blanking can be performed in a single operation and the threading in a second. The threading operation can moreover be performed much more quickly than a similar operation in the manufacture of nuts, for the reason that the washer ordinarily need not have a thickness greater than two of its threads. It is obvious from the foregoing description that if a double thread is employed, there will be two abrupt thread ends 20 on each surface of the nut. While it is preferred to form the helical portions 16 of the same pitch as the thread, the invention is not limited to this, as the pitch of these helices may be greater or less than the pitch of the thread.

Having thus described my invention, what I claim is:—

1. A nut lock comprising an internally threaded washer having the metal of and surrounding the threads upset to helical form, and forming a projection from each surface of the washer in which the thread is continued.

2. A nut lock comprising an internally threaded washer having the metal of and surrounding the threads upset to helical form of a pitch and direction corresponding with the threads and forming an abrupt ended projection on each surface of the washer in which the thread is continued.

3. A nut lock comprising an internally threaded washer having a helical annulus formed on each surface thereof, part of each annulus projecting beyond the surface of the washer and part being depressed below the surface of the washer, the thread being continued in said projecting portions.

4. A nut lock comprising an internally threaded washer having a helically formed annulus on each surface thereof of a pitch and direction corresponding with the thread, part of each annulus projecting beyond the surface of the washer and part being depressed below the surface and an abrupt face connecting the upper and lower portions of each annulus, said faces on opposite sides of the washer being arranged in line with one another and in the axial direction of the washer.

5. A nut lock comprising an internally threaded washer having a helically formed annulus on each surface thereof, part of each annulus projecting beyond the surface of the washer, and part being depressed below the surface, the depressed portions of the annulus on one side of the nut being in register with the projecting portions of the other side, and abrupt faces connecting the upper and lower portions of the annuli, said faces being arranged in line with one another.

In witness whereof, I have hereunto set my hand.

JOHN A. MacLEAN.

Copies of this patent may be obtained for five cents each, by addressing the "Commissioner of Patents, Washington, D. C."